UNITED STATES PATENT OFFICE.

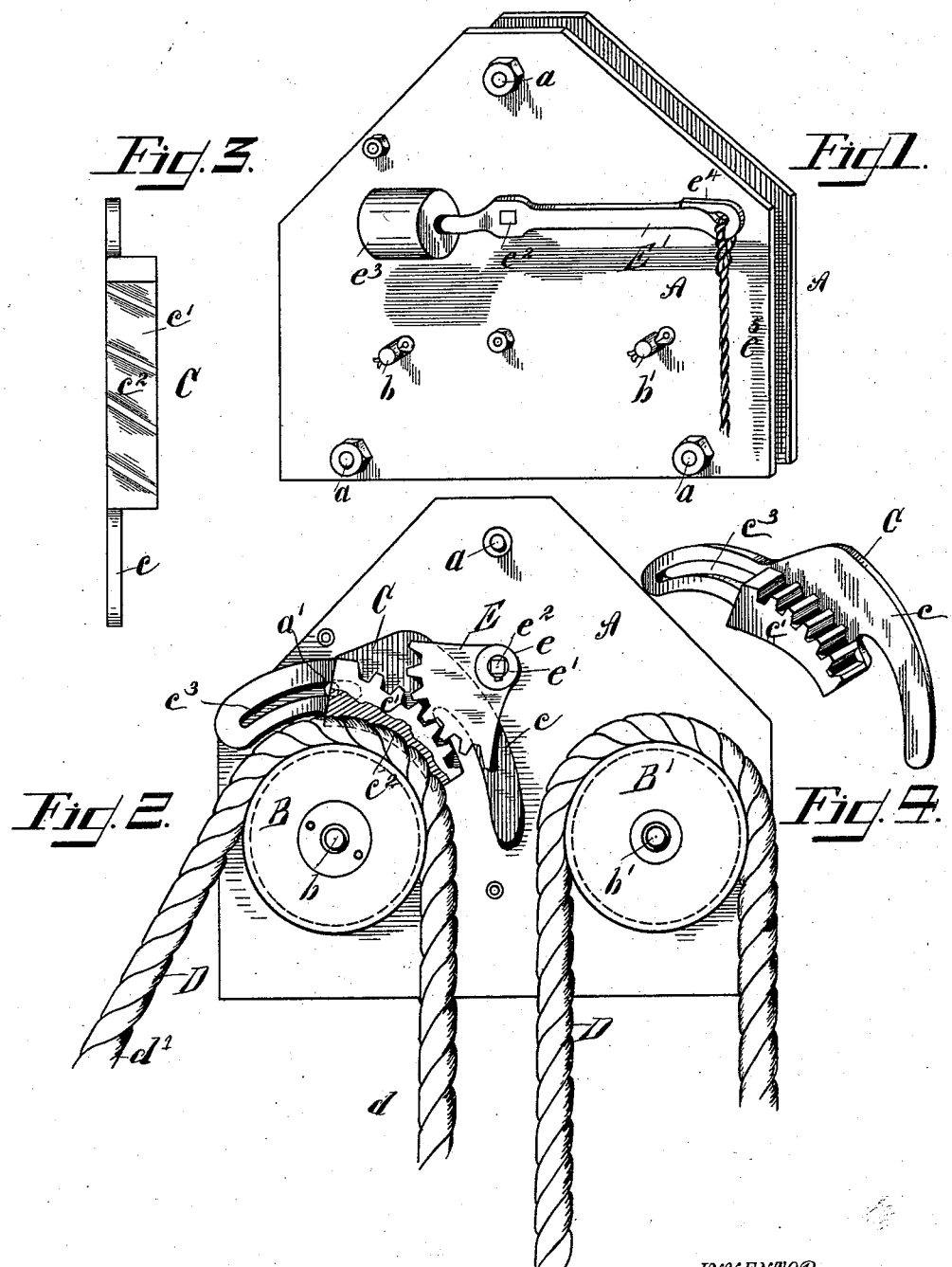

RANDOLPH B. MEEKER, OF DETROIT, MICHIGAN.

TACKLE-BLOCK.

SPECIFICATION forming part of Letters Patent No. 485,504, dated November 1, 1892.

Application filed February 24, 1892. Serial No. 422,599. (No model.)

*To all whom it may concern:*

Be it known that I, RANDOLPH B. MEEKER, a citizen of the United States, residing at Detroit, county of Wayne, State of Michigan, have invented a certain new and useful Improvement in Tackle-Blocks; and I declare the following to be a full, clear, and exact description of the invention, such as will enable others skilled in the art to which it pertains to make and use the same, reference being had to the accompanying drawings, which form a part of this specification.

My invention relates to tackle-blocks, and has for its object the provision of improved means for gripping the rope to hold the weight at any desired elevation.

In the drawings, Figure 1 is a perspective of a tackle-block, showing the weighted lever for unlocking the gripping device. Fig. 2 is a plan view of the gripping mechanism. Fig. 3 shows the concave face of the clamping-block with its diagonal corrugations adapted to fit over the strands of the rope. Fig. 4 is a view of the wedge-block employed in the clamping device.

In the drawings, A A are the supporting frames of the block, held in place by the bolts $a$ $a$.

B B' are sheaves mounted on bolts $b$ and $b'$, respectively. These two sheaves are to be used together when the block is used as a differential pulley.

C is a sliding wedge-shaped block. (Shown in Figs. 2, 3, and 4.) This block has the thin portion $c$, forming the wedge proper, and the thickened portion $c'$, and an extension provided with a curved slot $c^3$. The part $c'$ has at one side an incurved face, concave in cross-section, and having corrugations $c^2$ extending diagonally across it. The radius of the incurve is the same as that of the bent part of the rope $d$ where it passes around the sheave. The bias of the corrugations is substantially the same as that of the strands of the rope, and the corrugations have what may be termed a "pitch" equal to the pitch of the strands of the rope. The slot $c^3$ is traversed by a pin $a'$, and the slot $c^3$, being concentric or substantially concentric with the sheave B, coacts with the pin $a'$ to hold the wedge-block C from moving away from the rope, while it permits a circumferential movement for a part of the distance around the sheave and enables the wedging part $c$ to coact with the hub $e$, as hereinafter described, and cause the gripping portion $c'$ to press against the strands of the rope and grip the strands of the rope between itself and the sheave. The portion $c'$ is provided on the outside with teeth meshing with the teeth of the segment-wheel E. The segment-wheel E lies in front of the portion $c$ of the wedge-block and is provided with a hub portion $e$, against which the wedge engages. This segment-wheel E is keyed to the bolt $e'$, which extends outside of the frame and is provided with a square end $e^2$ and has secured to it the lever E'. This lever E' is provided on one end with a weight $e^3$ and on the opposite end with the eye $e^4$, in which to secure an operating-rope $e^5$.

The operation of my device is as follows: The weight being on the portion $d$ of the rope and the power applied to the portion $d'$, the rope is free to move in the direction of the power; but if the rope moves in the direction of the weight the wedge-block C is carried forward by the friction of the rope and caused to wedge between the rope and the hub $e$ of the segment-rack E and the rope firmly clamped between the incurved and concaved portion of the wedge-block C and the sheave B, the strands of the rope entering naturally the corrugations $c^2$ in the concave surface, thus gripping two or more strands of the rope between these surfaces. I am not aware that a holding or pressure block has ever been employed with an incurved concave surface provided with the diagonal corrugations adapted to embrace two or more strands of the rope. To aid in moving the wedge-block C into engagement with the rope, the weight $e^3$ is employed. When it is desired to lower the weight again, the wedge can be loosened by drawing on the small rope $e^5$ and actuating the segmental gearing. If it is again desired to raise the weight, the movement of the rope in the direction of the power will loosen the wedge and the rope may be freely run in this direction, and when again allowed to move in the opposite direction the wedge will again grip the rope.

I prefer to construct the thickened portion $c'$ of the wedge-block C wedge-shaped in form—that is, thicker at the upper than at the lower end; but this construction can be varied by making the segmental rack eccentric in form, and I would have it understood that either form may be employed without departing from my invention, and I would have it understood, further, that the wedge abutting against the hub of the segmental rack may be dispensed with and the wedging operation permitted between the segmental gearing and the thickened portion of the wedge-block without departing from my invention, although I prefer the construction herein shown, in which the gearing works loosely and avoids wedging against the return when desired to release the rope.

What I claim is—

1. In a tackle-block, the combination of a sheave, a wedge adapted to press against a rope between itself and said sheave, and a bearing $e$, adapted to hold said wedge against said rope, the said wedge being provided with an incurved concave surface adapted to press against said rope and provided with diagonal corrugations across said concave, the said wedge being also provided with rack-teeth adapted to engage with a segment-wheel made fast to said bearing, substantially as and for the purpose described.

2. In a tackle-block, the combination of a sheave, the supporting-framework, a bearing $e$, and a segment-wheel connected therewith, and a curved wedge provided with faces adapted to bear against said bearing and a rope on said sheave and provided, also, with a curved slot adapted to engage with a guiding-pin, substantially as and for the purpose described.

3. In a tackle-block, the combination of a sheave, the bearing $e$, and segment-wheel E, the curved wedge C, provided with the bearing part $c$, the toothed part $c'$, the incurved corrugated concave face, and a slotted extension, substantially as and for the purpose described.

4. In a tackle-block, the combination of a sheave, a bearing $e$, and segment-wheel, a curved wedge having the bearing part $c$, the incurved bearing-face, and the toothed part $c'$, and the lever $E'$, with the counter-weight $e^3$, substantially as and for the purpose described.

In testimony whereof I sign this specification in the presence of two witnesses.

RANDOLPH B. MEEKER.

Witnesses:
CHARLES H. FISK,
MARION A. REEVE.